United States Patent
Lee et al.

(10) Patent No.: US 10,312,959 B2
(45) Date of Patent: Jun. 4, 2019

(54) SEMICONDUCTOR DEVICE AND OPERATING METHOD OF SEMICONDUCTOR DEVICE

(71) Applicant: Samsung Electronics Co., Ltd., Gyeonggi-do (KR)

(72) Inventors: Jong Woo Lee, Seoul (KR); Jae Hoon Lee, Gyeonggi-do (KR); Jong Mi Lee, Gyeongsangbuk-do (KR); Thomas Byung Hak Cho, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 57 days.

(21) Appl. No.: 15/453,577

(22) Filed: Mar. 8, 2017

(65) Prior Publication Data
US 2017/0264334 A1  Sep. 14, 2017

(30) Foreign Application Priority Data

Mar. 8, 2016 (KR) .......................... 10-2016-0027626
Jun. 13, 2016 (KR) .......................... 10-2016-0073107

(51) Int. Cl.
*H04B 1/401* (2015.01)
*H04B 1/00* (2006.01)
*H04W 88/06* (2009.01)

(52) U.S. Cl.
CPC ............ *H04B 1/401* (2013.01); *H04B 1/0067* (2013.01); *H04W 88/06* (2013.01)

(58) Field of Classification Search
CPC ...... H04B 1/401; H04B 1/0067; H04W 88/06
See application file for complete search history.

(56) References Cited

U.S. PATENT DOCUMENTS 7,398,102 B2   7/2008 Hidehiro et al.
7,486,217 B2   2/2009 Matsushita et al.
(Continued)

FOREIGN PATENT DOCUMENTS

JP   2006-060673   *   3/2006
JP   2006-093870       4/2006
(Continued)

*Primary Examiner* — Nay A Maung
*Assistant Examiner* — Angelica M Perez
(74) *Attorney, Agent, or Firm* — The Farrell Law Firm, P.C.

(57) ABSTRACT

Provided are a semiconductor device and an operating method thereof.
The semiconductor device includes a mode controller configured to output a first control signal in a first communication mode, and output a second control signal in a second communication mode which is different from the first communication mode; and a configurable circuit configured to generate a first output signal to be transmitted to a first type analog-to-digital converter (ADC) in the first communication mode, and generate a second output signal using a second type ADC in the second communication mode, wherein the configurable circuit comprises a switching circuit configured to change a circuit configuration to a first circuit configuration for generating a first output signal in the first communication mode or to a second circuit configuration for generating a second output signal in the second communication mode, depending on the first control signal or the second control signal received from the mode controller.

20 Claims, 9 Drawing Sheets

(56) References Cited

U.S. PATENT DOCUMENTS

| | | | |
|---|---|---|---|
| 8,078,130 B2 * | 12/2011 | Fudge | H04B 1/1036 |
| | | | 455/295 |
| 8,102,292 B1 | 1/2012 | Van Ess | |
| 8,126,094 B2 | 2/2012 | Komaili et al. | |
| 8,519,878 B2 | 8/2013 | Jensen et al. | |
| 9,054,726 B2 | 6/2015 | Okuda et al. | |
| 9,083,397 B2 | 7/2015 | Lee et al. | |
| 2003/0228852 A1 * | 12/2003 | Murakami | H03G 1/0088 |
| | | | 455/127.3 |
| 2010/0056201 A1 | 3/2010 | Akamine et al. | |
| 2015/0109159 A1 | 4/2015 | Liu et al. | |
| 2017/0310334 A1 * | 10/2017 | Chen | H03M 1/14 |

FOREIGN PATENT DOCUMENTS

| | | |
|---|---|---|
| JP | 2010-109908 | 5/2010 |
| JP | 5695629 | 5/2014 |

* cited by examiner

US 10,312,959 B2

SEMICONDUCTOR DEVICE AND OPERATING METHOD OF SEMICONDUCTOR DEVICE

PRIORITY

This application claims priority under 35 U.S.C. § 119(a) to a Korean Patent Application filed on Mar. 8, 2016 in the Korean Intellectual Property Office and assigned Serial No. 10-2016-0027626 and to a Korean Patent Application filed on Jun. 13, 2016 in the Korean Intellectual Property Office and assigned Serial No. 10-2016-0073107, the entire disclosures of each of which are incorporated herein by reference.

BACKGROUND

1. Field of the Disclosure

The present disclosure relates generally to a semiconductor device and an operating method thereof, and more particularly to a semiconductor device and an operating method thereof for converting an analog signal into a digital signal by utilizing different types of analog-to-digital converters depending on communication modes.

2. Description of the Related Art

A baseband used in a mobile communication system covers a very wide range from a bandwidth of 100 kHz for a 2nd generation (2G) communication system to a bandwidth of 20 MHz for a 3rd generation (3G) or 4th generation (4G) communication system, and the highest bandwidth reaches 100 times or more as compared to the lowest bandwidth. A multi-mode mobile terminal configured to use the 2G mode for a voice call and use the 3G or 4G mode (3G/4G) for data communication must include a multi-mode and multi-band radio transceiver, where the radio transceiver requires an analog baseband filter which can support all of the various bandwidths.

SUMMARY

An aspect of the present disclosure provides a semiconductor device for converting an analog signal into a digital signal by utilizing different types of analog-to-digital converters depending on communication modes.

Another aspect of the present disclosure provides a method of operating a semiconductor device for converting an analog signal into a digital signal by utilizing different types of analog-to-digital converters depending on communication modes.

According to an aspect of the present disclosure, there is a provided a semiconductor device. The semiconductor device includes a mode controller that outputs a first control signal in a first communication mode, and outputs a second control signal in a second communication mode, which is different from the first communication mode; and a configurable circuit that generates a first output signal for being transmitted to a first type analog-to-digital converter (ADC) in the first communication mode, and generates a second output signal using a second type ADC in the second communication mode, wherein the configurable circuit comprises a switching circuit that changes the circuit configuration to a first circuit configuration for generating the first output signal in the first communication mode or to a second circuit configuration for generating the second output signal in the second communication mode, depending on the first control signal or the second control signal received from the mode controller.

According to another aspect of the present disclosure, there is a provided a semiconductor device. The semiconductor device includes a switching circuit that comprises one or more switches which operate depending on a communication mode comprising a first communication mode and a second communication mode; and a digital signal generation circuit that receives input of an analog signal, generates a digital signal using a first type ADC when the one or more switches are in a first condition, and generates a digital signal using a second type ADC when the one or more switches are in a second condition, which is different from the first condition, wherein a circuit configuration of the digital signal generation circuit comprises a first circuit configuration for generating the digital signal in the first communication mode, and a second circuit configuration for generating the digital signal in and the second communication mode, and when the conditions of the one or more switches are changed, the first circuit configuration and the second circuit configuration are changed to each other.

According to another aspect of the present disclosure, there is a provided a method of operating a semiconductor device. The method includes setting a configurable circuit to a first circuit configuration in a first communication mode, the configurable circuit generating a first output signal in the first communication mode, and the configurable circuit generating a second output signal in a second communication mode, which is different from the first communication mode; generating a first output signal for being transmitted to a first type ADC, using the configurable circuit having the first circuit configuration; changing the circuit configuration of the configurable circuit to a second circuit configuration from the first circuit configuration, when the first communication mode is changed to the second communication mode; and generating the second output signal, using the configurable circuit having the second circuit configuration.

BRIEF DESCRIPTION OF THE DRAWINGS

The above and other aspects, features, and advantages of the present disclosure will become more apparent from the following detailed description, taken in conjunction with the accompanying drawings, in which:

FIG. 9 is a block diagram of a system on chip (SoC) according to an embodiment of the present disclosure; and FIGS. 10 to 12 are semiconductor systems to which semiconductor devices according to embodiments of the present disclosure may be applicable.

DETAILED DESCRIPTION OF EMBODIMENTS OF THE PRESENT DISCLOSURE

Figure 1A:
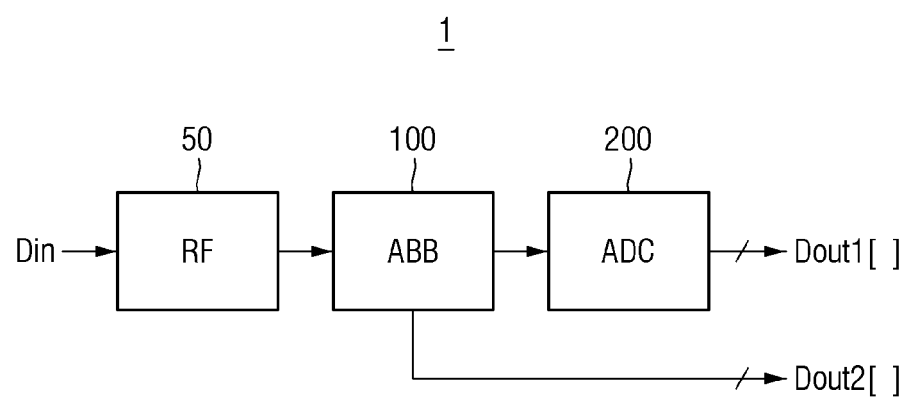
FIG. 1A is a block diagram of a semiconductor device according to an embodiment of the present disclosure.

FIG. 1A is a block diagram of a semiconductor device 1 according to an embodiment of the present disclosure.

Figure 1B:
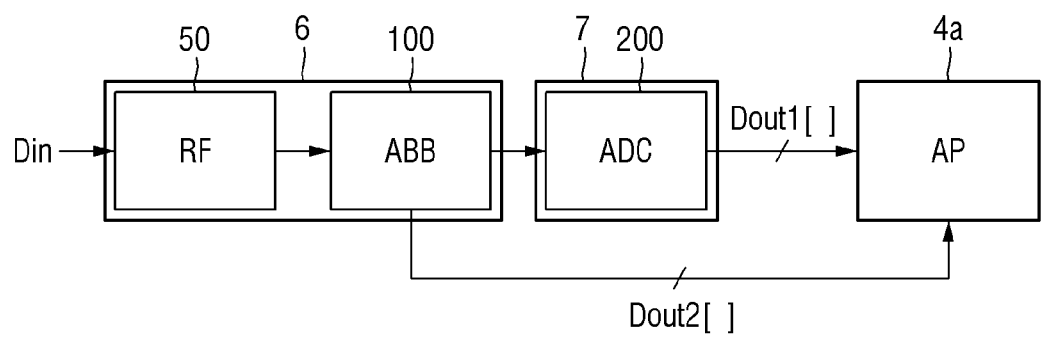
FIGS. 1B to 1D are block diagrams of semiconductor devices according to embodiments of the present disclosure.
Figure 1C:
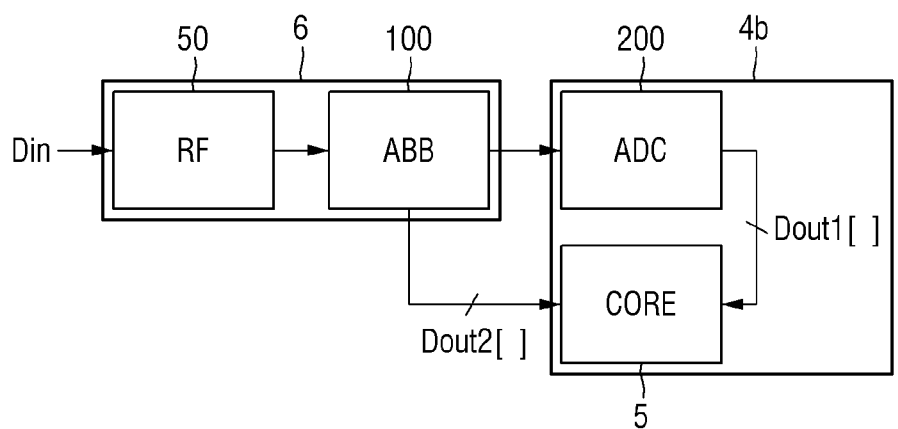
Figure 1D:
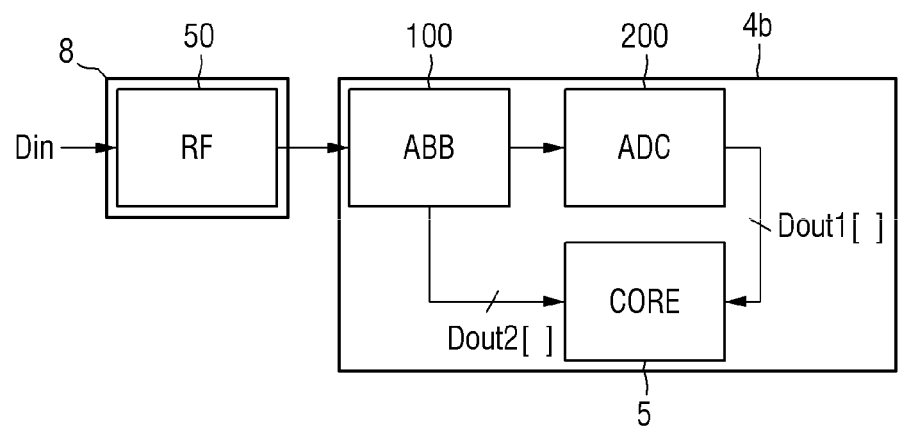

FIGS. 1B to 1D are block diagrams of semiconductor devices according to embodiments of the present disclosure.

Referring to FIG. 1A, the semiconductor device 1 includes a radio frequency (RF) receiver 50, an analog baseband (ABB) filter 100 and a first type analog-to-digital converter (ADC) 200.

The RF receiver 50 wirelessly receives a modulation signal and may include one or more filters. The filters may include a low-noise amplifier (LNA), a mixer, a transimpedance amplifier (TIA) and the like, but the present disclosure is not limited thereto. In this case, the mixer performs a frequency conversion of a received modulation signal into a baseband, so that the ABB filter 100 described below may process the modulation signal.

The ABB filter 100 demodulates an analog signal provided from the RF receiver 50 to a baseband. In an embodiment of the present disclosure, the ABB filter 100 may be used for a radio transceiver that supports radio communication techniques of various bandwidths, such as, for example, global system for mobile communications (GSM), enhanced data GSM environment (EDGE), high speed packet access (HSPA), wideband code division multiple access (WCDMA), long term evolution (LTE) 1.4M, LTE 3M, LTE 5M, LTE 10M, LTE 15M, and LTE 20M.

The first type ADC 200 converts an analog signal, which is demodulated to the baseband by the ABB filter 100, into a digital signal. In an embodiment of the present disclosure, the first type ADC 200 may include a Nyquist ADC advantageous for high-speed operation. For example, the first type ADC 200 may include a successive approximation register ADC (SAR ADC).

In an embodiment of the present disclosure, the RF receiver 50, the ABB filter 100 and the first type ADC 200 may be provided as a single integrated circuit (IC) or chip. However, the present disclosure is not limited thereto.

Referring to FIG. 1B, in an embodiment of the present disclosure, the RF receiver 50 and the ABB filter 100 may be provided as a first chip 6, and the ADC 200 may be provided as a second chip 7 which is different from the first chip 6. For example, the first chip 6 may include an RF transceiver mounted on a mobile device, and the second chip 7 may include a modem that is electrically connected to a standalone application processor (AP) 4a mounted on the mobile device.

Referring to FIG. 1C, in in an embodiment of the present disclosure, the RF receiver 50 and the ABB filter 100 may be provided as the first chip 6, and the ADC 200 may be provided inside an application processor (AP) 4b mounted on a mobile device. In this case, the first chip 6 may include an RF transceiver mounted on the mobile device, the AP 4b may include a processing core 5, and a modem core electrically connected to the processing core 5, and the ADC 200 may be provided on the modem core.

Referring to FIG. 1D, in an embodiment of the present disclosure, the RF receiver 50 may be provided as a third chip 8, and the ABB filter 100 and the ADC 200 may be provided inside the AP 4b mounted on a mobile device. In this case, the third chip 8 may include an RF transceiver mounted on the mobile device. That is, the AP 4b may include the ABB filter 100 and the ADC 200, and a processing core 5 which receives output signals Dout1 [ ] and Dout2[ ] from the ABB filter 100 and the ADC 200.

In general, in order to process a low band signal such as 2G, there is a need for a resistor and a capacitor of very high values that determine a cutoff frequency of the ABB filter 100, which significantly increases chip area of the analog filter. For example, a capacitor for processing a low band of 2G has a size that is several times larger than a capacitor for processing a band of 3G/4G and the chip area of the analog filter increases several times accordingly. In a state in which the 3G mode or the 4G mode is driven, when the circuit area of the analog filter greatly increases because of the 2G mode that is turned off, the process costs rise and the length of a transmission line increases. Thus, an error of a signal increases, noise rises, and the characteristics of the signal may also be degraded. In addition, to demodulate a filtered signal in the case of 2G, it is necessary to use an ADC with a sufficient operating range.

According to an embodiment of the present disclosure, an ADC of a type advantageous for high speed operation is used in the 3G/4G communication mode, an ADC of a type operating at low speed and having high resolution is used in the 2G communication mode, but an ADC used in the 2G communication mode is used by borrowing an operational amplifier (OP AMP) that is used in a filter (e.g., a low pass filter) or an amplifier (e.g., a gain amplifier) in the 3G/4G communication mode. Further, in the 2G communication mode, an ADC of a type advantageous for high speed operation is turned off Thus, it is possible to solve problems such as an increase in circuit area of an analog filter and power consumption.

Figure 2:
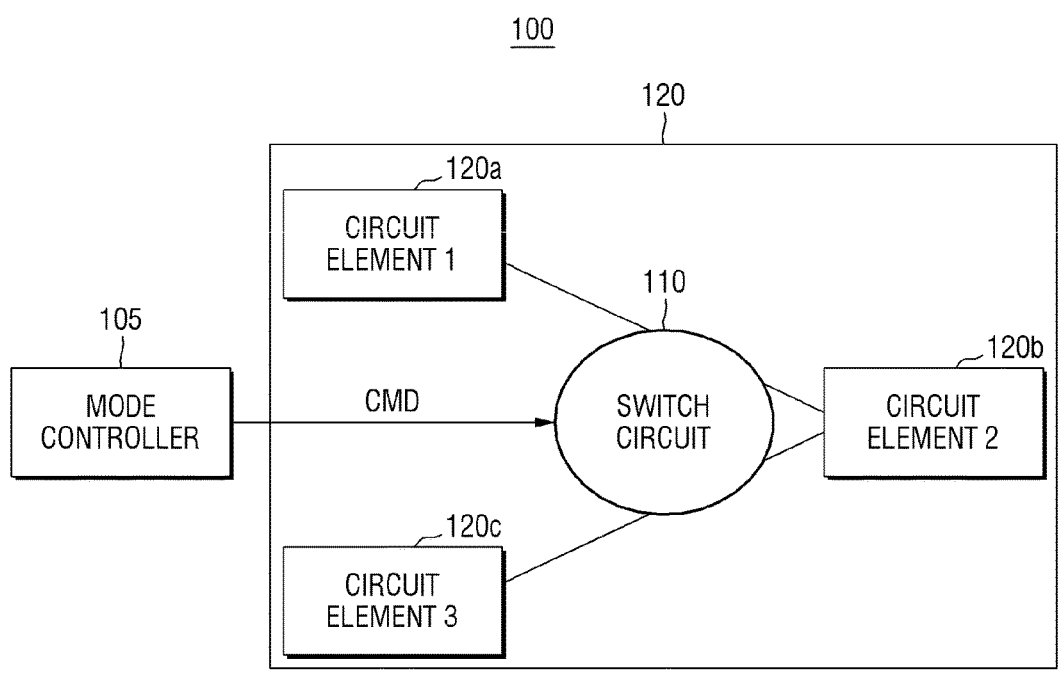
FIG. 2 is a block diagram of an analog baseband filter according to an embodiment of the present disclosure.

FIG. 2 is a block diagram of the ABB filter 100 according to an embodiment of the present disclosure.

Referring to FIG. 2, the ABB filter 100 includes a mode controller 105 and a configurable circuit 120.

The mode controller 105 outputs a control signal CMD for controlling a switching circuit 110 depending on the communication mode. For example, the mode controller 105 may output a first control signal in a first communication mode and may output a second control signal in a second communication mode.

In an embodiment of the present disclosure, a first baseband corresponding to the first communication mode may have a bandwidth higher than the second baseband corresponding to the second communication mode. For example, the first communication mode includes a 3G/4G communication mode, and the second communication mode may include a 2G communication mode.

In an embodiment of the present disclosure, recognition of the communication mode may be performed through any hardware provided in the semiconductor device in which the ABB filter 100 is used. For example, the communication mode may be recognized by the RF receiver 50, but the present disclosure is not limited thereto. After the communication mode is recognized, the mode controller 105 may receive a signal indicating the communication mode through hardware or software. However, the present disclosure is not limited thereto, and the ABB filter 100 may be embedded with a circuit that can directly recognize the communication mode.

The configurable circuit 120 refers to a circuit that is capable of switching the circuit configuration. The configurable circuit 120 includes a switching circuit 110 that is capable of changing the circuit configuration of the configurable circuit 120 depending on a control signal received from the mode controller 105. When the condition of the switching circuit 110 changes, a connection relation between the circuit elements of the configurable circuit 120 changes. That is, the configurable circuit 120 is a circuit that is provided to perform other operations, depending on the condition of the switching circuit 110.

In this case, the circuit configuration refers to a connection relation between the circuit elements. For example, if the circuit elements include first to third circuit elements 120a, 120b and 120c, the first circuit configuration may be formed to perform the first operation by electrically connecting the first circuit element 120a and the second circuit element 120b and by electrically disconnecting the second circuit element 120b and the third circuit element 120c, and the second the circuit configuration may be formed to perform the second operation, which is different from the first operation, by electrically connecting the second circuit element 120b and the third circuit element 120c and by electrically disconnecting the first circuit element 120a and the second circuit element 120b.

In an embodiment of the present disclosure, the circuit configuration of the ABB filter 100 may include a first circuit configuration for generating output signals in the first communication mode (e.g., the 3G/4G communication mode), and a second circuit configuration for generating output signals in the second communication mode (e.g., the 2G communication mode).

In addition, in an embodiment of the present disclosure, although the mode controller 105 has been described as being provided in the ABB filter 100, the present disclosure is not limited thereto. That is, the mode controller 105 may also be provided outside of the ABB filter 100.

Figure 3:
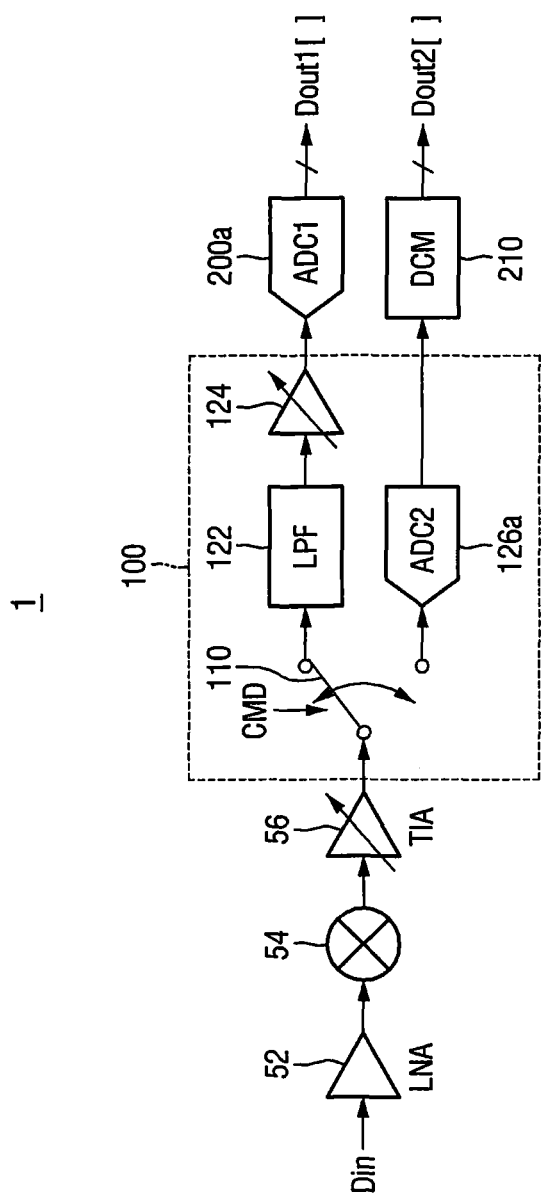
FIG. 3 is a schematic diagram of an analog baseband filter according to an embodiment of the present disclosure.

FIG. 3 is a schematic diagram of the ABB filter 100 according to an embodiment of the present disclosure.

Referring to FIG. 3, the ABB filter 100 according to an embodiment of the present disclosure generates a first output signal for being input to the first type ADC 200a in the first communication mode, and generates a second output signal using the second type ADC 126a in the second communication mode. In this case, the first output signal includes an analog signal, and the second output signal includes a digital signal.

The ABB filter 100 receives an analog signal that has passed through a LNA 52, a mixer 54 and a TIA 56 corresponding to the RF receiver 50.

The switching circuit 110 of the ABB filter 100 receives a control signal CMD according to a communication mode from the mode controller 105, and changes the circuit configuration of the ABB filter 100 depending on the control signal CMD.

For example, the switching circuit 110 may change the circuit configuration of the ABB filter 100 to the first circuit configuration for generating the first output signal in the first communication mode. In an embodiment of the present disclosure, the first circuit configuration may include a low pass filter 122 and a gain amplifier 124. The gain amplifier 124, for example, may include a variable gain amplifier (VGA) or a programmable gain amplifier (PGA), but the present disclosure is not limited thereto.

In addition, the switching circuit 110 may change the circuit configuration of the ABB filter 100 to a second circuit configuration for generating a second output signal in the second communication mode. In this embodiment, the first circuit configuration may include a second type ADC 126a. The second type ADC 126a may also include an oversampling ADC.

It should be noted that, although the low pass filter 122 and the gain amplifier 124 corresponding to the first circuit configuration, and the second type ADC 126a corresponding to the second circuit configuration are illustrated as separate elements, and the conceptual operations are separate, but an actual circuit may be provided as a single circuit (the configurable circuit 120 described above with reference to FIG. 2).

That is, if the configurable circuit 120 is set as the first type, the low pass filter 122 and the gain amplifier 124 corresponding to the first circuit configuration may be provided, and when the configurable circuit is set as the second type, the second type ADC 126a corresponding to the second circuit configuration may be provided. In this case, the OP AMP used to provide the second type ADC 126a in the second circuit configuration may be the same circuit element as the OP AMP used to provide the low pass filter 122 in the first circuit configuration. Similarly, a comparator used to provide the second type ADC 126a in the second circuit configuration may be the same circuit element as a comparator used to provide the gain amplifier 124 in the first circuit configuration. Such a circuit setting is performed by the aforementioned switching circuit 110.

Thus, in the first communication mode, the analog input signal Din is converted into the digital output signal Dout1 [ ] using the ABB filter 100 and the first type ADC 200a having the first circuit configuration, and in the second communication mode, the analog input signal Din may be converted into the digital output signal Dout2[ ] using the ABB filter 100 having the second circuit configuration. In this case, the second output signal output from the ABB filter 100 having the second circuit configuration may pass through a decimation (DCM) filter 210 for removing noise, and may be output as the digital output signal Dout2[ ].

In this case, as the ABB filter 100 adopts the configurable circuit 120 in which the circuit configuration is changed by the switching circuit 110, while sharing the circuit elements, it is possible to reduce the circuit area of the ABB filter 100.

In this case, because the first type ADC 200a is turned on in the first communication mode and the first type ADC 200a is turned off in the second communication mode, it is also possible to reduce power.

Figure 4:
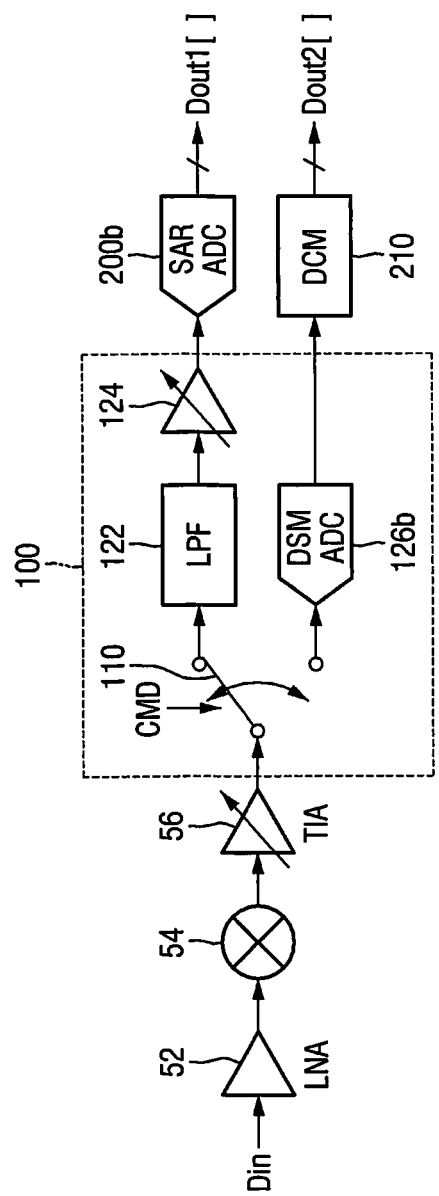
FIG. 4 is a schematic diagram of an analog baseband filter according to an embodiment of the present disclosure.

FIG. 4 is a schematic diagram of the ABB filter 100 according to an embodiment of the present disclosure.

Referring to FIG. 4, the ABB filter 100 according to an embodiment of the present disclosure generates a first output signal for being input to the first type ADC 200b in the first communication mode, and generates a second output signal using the second type ADC 126b in the second communication mode. In this case, the first output signal includes an analog signal, and the second output signal includes a digital signal.

Similar to FIG. 3, the switching circuit 110 of the ABB filter 100 receives a control signal CMD according to the communication mode from the mode controller 105, and changes the circuit configuration of the ABB filter 100 depending on the control signal CMD.

Specifically, the switching circuit 110 may change the circuit configuration of the ABB filter 100 to the first circuit configuration for generating the first output signal in the first communication mode. In this case, the first circuit configuration may include a low pass filter 122 and a gain amplifier 124.

In addition, the switching circuit 110 may change the circuit configuration of the ABB filter 100 to the second circuit configuration for generating the second output signal in the second communication mode. In this case, the first circuit configuration may include the second type ADC 126b.

In this case, the first type ADC 200b may include a successive approximation register ADC (SAR ADC).

In addition, in an embodiment of the present disclosure, the second type ADC 126b may include a delta-sigma modulation ADC (DSM ADC). The DSM ADC is not restricted to the number of orders or the number of output bits. That is, the DSM ADC may have a third, fourth or more configuration, and may also have an output bit of 2 bits or more.

In this case, although the low pass filter 122 and the gain amplifier 124 corresponding to the first circuit configuration, and the second type ADC 126a corresponding to the second circuit configuration are illustrated as separate elements, the conceptual operations are separate, but a circuit may be provided as a single circuit (e.g. the configurable circuit 120 described above with reference to FIG. 2).

Thus, in the first communication mode, the analog input signal Din is converted into a digital output signal Dout1 [ ] using the ABB filter 100 and the SAR ADC 200b having the first circuit configuration, and in the second communication mode, the analog input signal Din may be converted into a digital output signal Dout2[ ] using the DSM ADC 126b as the ABB filter 100 having the second circuit configuration. In this case, the second output signal output from the DSM ADC 126b having the second circuit configuration may pass through the DCM filter 210 for removing noise, and may be output as the digital output signal Dout2[ ].

In this case, as the ABB filter 100 adopts the configurable circuit 120 in which the circuit configuration is changed by the switching circuit 110, while sharing the circuit elements, it is possible to reduce the circuit area of the ABB filter 100.

In this case, because the SAR ADC 200b is turned on in the first communication mode and the SAR ADC 200b is turned off in the second communication mode, it is also possible to reduce power.

Figure 5:
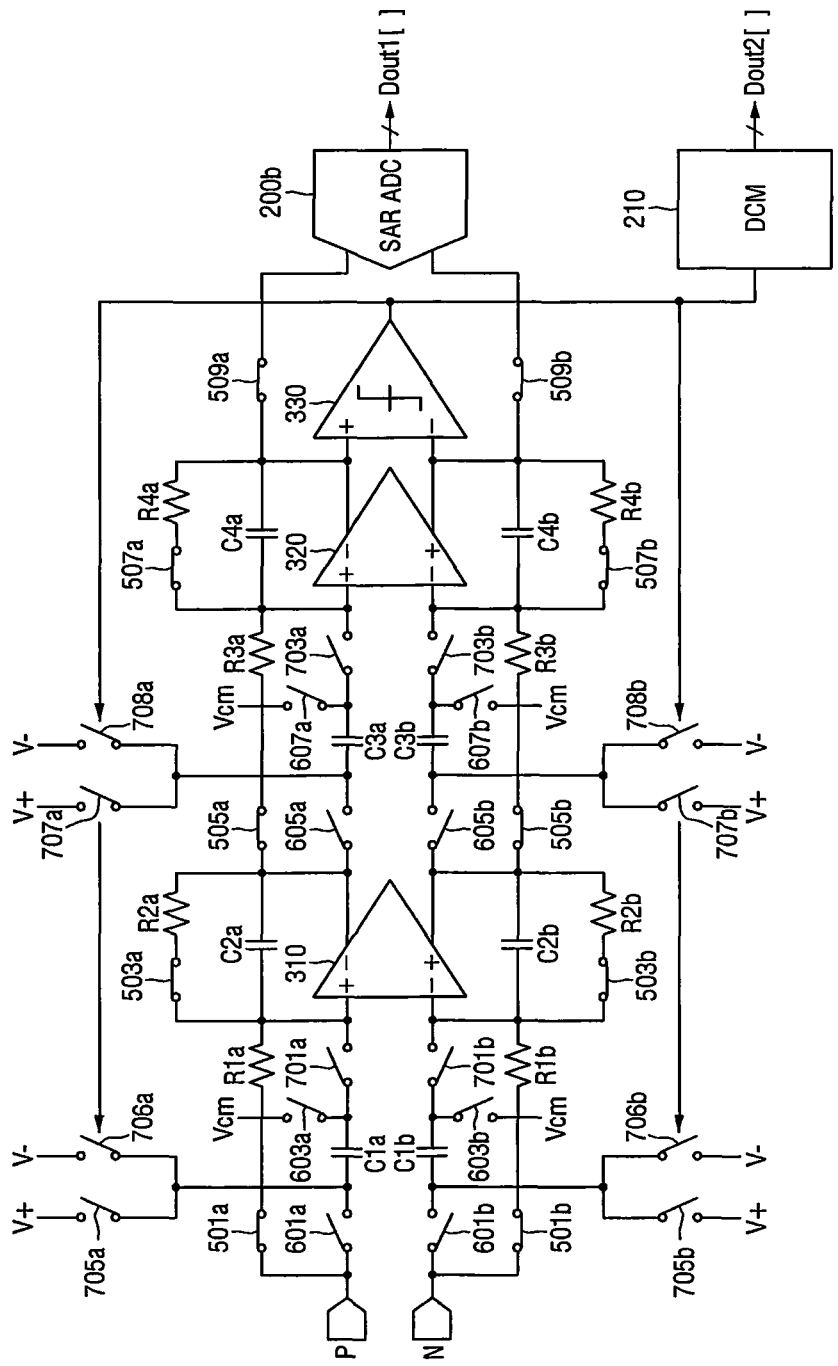
FIGS. 5 to 7 are circuit diagrams of semiconductor devices according to embodiments of the present disclosure.
Figure 6:
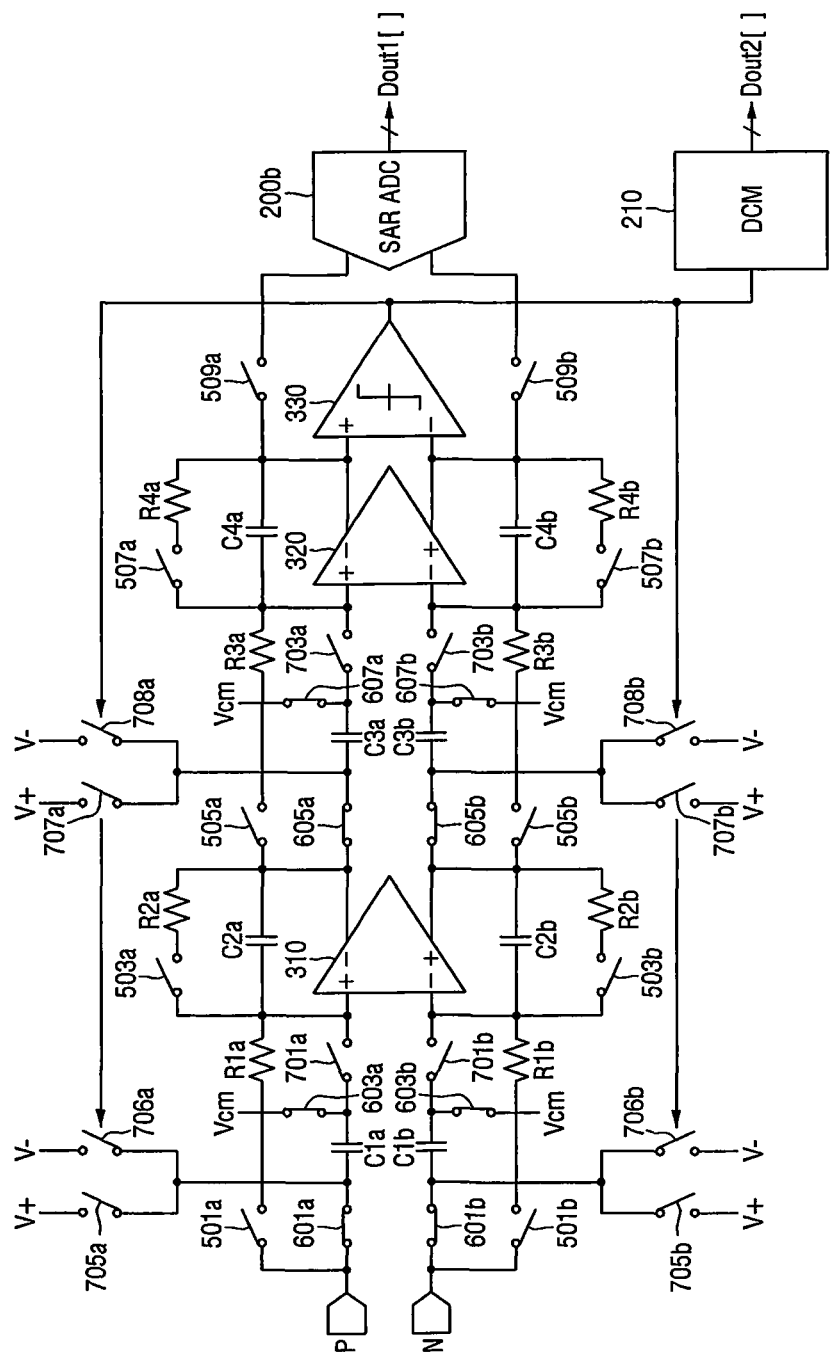
Figure 7:
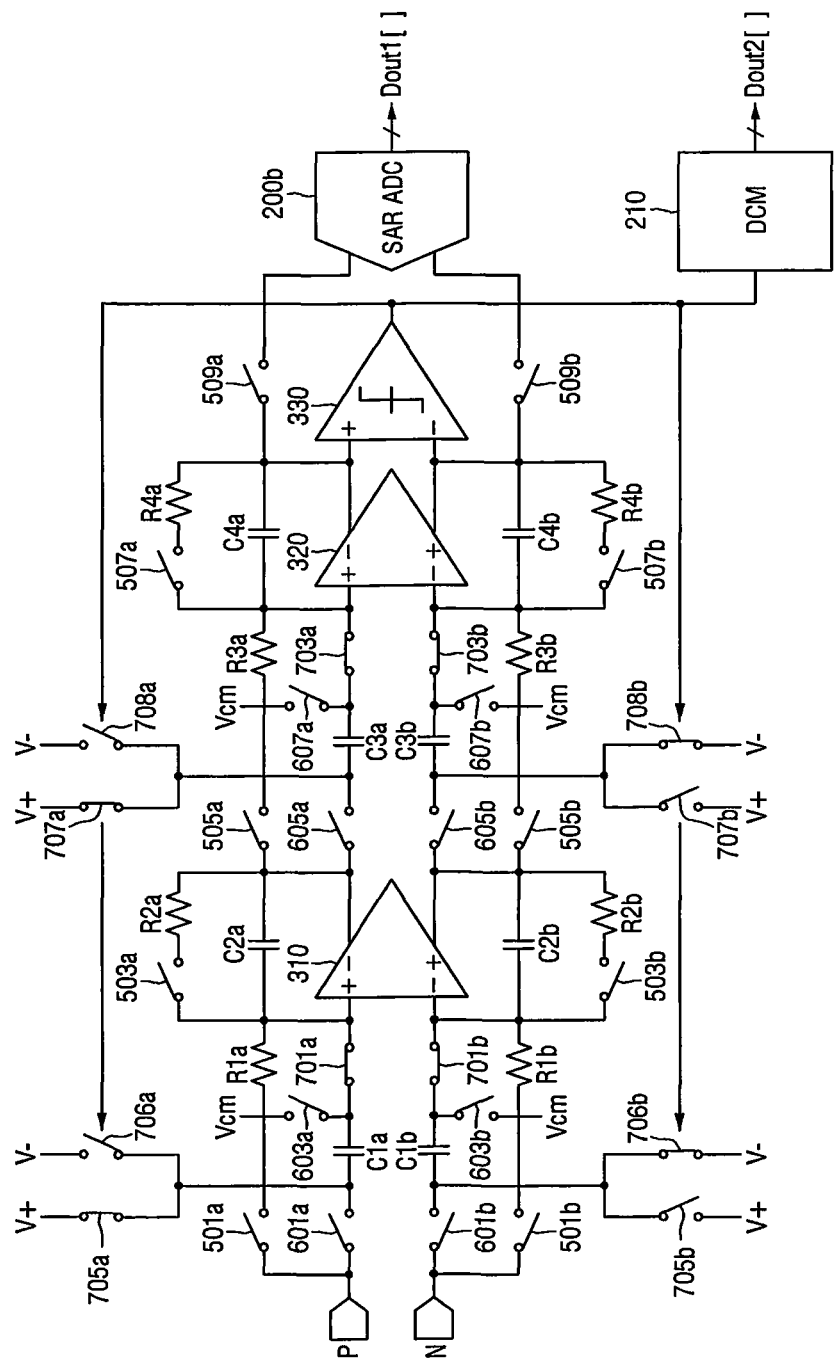

FIGS. 5 to 7 are circuit diagrams of semiconductor devices according to embodiments of the present disclosure.

Referring to FIGS. 5 to 7, the circuits illustrate digital signal generation circuits which generate digital signals using the first type ADC 200b when one or more switches 501a, 501b, 503a, 503b, 505a, 505b, 507a, and 507b are in the first condition, and generates a digital signal using a second type ADC when one or more switches 501a, 501b, 503a, 503b, 505a, 505b, 507a, and 507b are in the second condition, which is different from the first condition.

The one or more switches 501a, 501b, 503a, 503b, 505a, 505b, 507a, and 507b operate according to the communication mode. For example, if the communication mode is the first communication mode, as illustrated in FIG. 5, the switch 501a, 503a, 505a, and 507a are closed, and the low pass filter using the OP AMPs 310 and 320 and the gain amplifier using the comparator 330 may be provided. In contrast, if the communication mode is the second communication mode, as illustrated in FIGS. 6 and 7, the delta-sigma modulation ADC may be provided by utilizing a summer using the capacitors C1a, C1b, C3a, and C3b, an integrator using the OP AMPs 310 and 320, and a comparator 330, depending on the setting of the switches 601a, 601b, 603a, 603b, 605a, 605b, 607a, and 607b and the switches 701a, 701b, 703a, and 703b.

That is, in FIG. 5 in which the communication mode is the first communication mode, the switches 501a, 501b, 503a, 503b, 505a, 505b, 507a, and 507b are closed, and the switches 601a, 601b, 603a, 603b, 605a, 605b, 607a, 607b, 701a, 701b, 703a, and 703b are open to form a first circuit configuration which implements the low pass filter 122 and the gain amplifier 124 described above in FIGS. 3 and 4.

Further, in FIGS. 6 and 7 in which the communication mode is the second communication mode, the switches 501a, 501b, 503a, 503b, 505a, 505b, 507a, and 507b are open, and the switches 601a, 601b, 603a, 603b, 605a, 605b, 607a, 607b, 701a, 701b, 703a, and 703b are alternately open to form the second circuit configuration which implements the DSM ADC 126 described above with reference to FIGS. 3 and 4.

Embodiments illustrated in FIGS. 5 to 7 are only examples, and the present disclosure is not limited thereto.

An operating method of a semiconductor device described above includes setting the ABB filter 100 to the first circuit configuration in the first communication mode, and generating the first output signal for being input to the first type ADC 200 using the ABB filter 100 having the first circuit configuration.

Further, the method further includes changing the ABB filter 100 from the first circuit configuration to the second circuit configuration if the first communication mode changes to the second communication mode, which is different from the first communication mode, and generating the second output signal using the ABB filter 100 having the second circuit configuration.

Further, the method further includes changing the ABB filter 100 from the second circuit configuration to the first circuit configuration if the second communication mode changes to the first communication mode.

Figure 8:
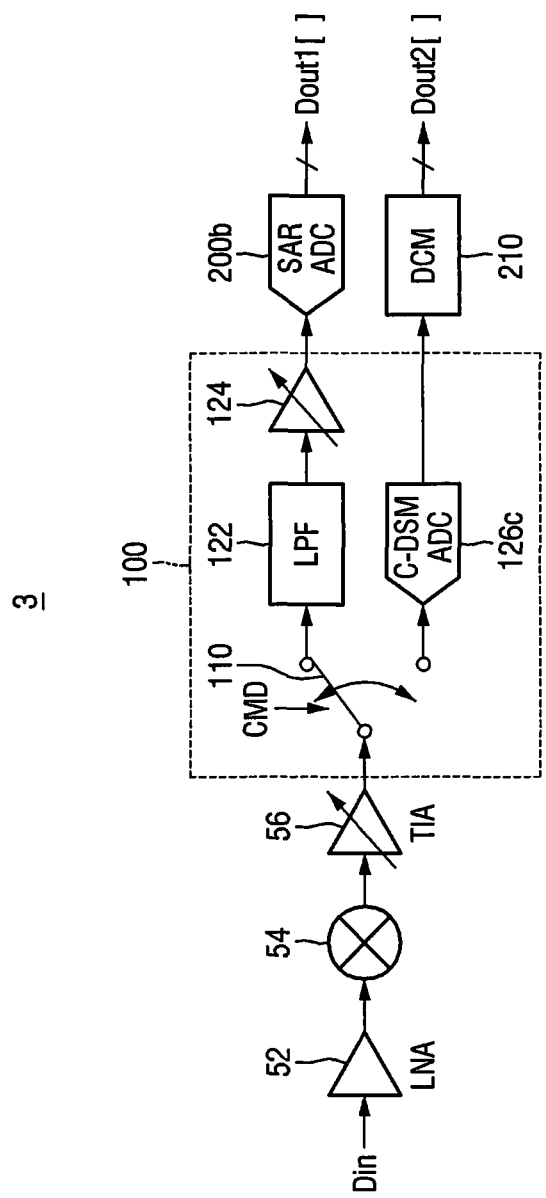
FIG. 8 is a schematic diagram of a baseband filter according to an embodiment of the present disclosure.

FIG. 8 is a schematic of a baseband filter according to an embodiment of the present disclosure.

Referring to FIG. 8, the delta-sigma modulation ADC illustrated in FIGS. 5 to 7 is provided as a discrete-time delta-sigma modulation ADC, but in this embodiment, the delta-sigma modulation ADC is provided as a continuous-time delta-sigma modulation ADC.

Accordingly, in the first communication mode, an analog input signal Din is converted into a digital output signal Dout1 [ ] by utilizing an ABB filter 100 and an SAR ADC 200b having the first circuit configuration, and in the second communication mode, the analog input signal Din may be converted into a digital output signal Dout2[ ] by further utilizing the continuous-time delta-sigma modulation ADC 126c as the ABB filter 100 having the second circuit configuration. In this case, the second output signal output from the continuous-time delta-sigma modulation ADC 126c having the second circuit configuration may pass through the DCM filter 210 for removing noise, and may be output as a digital output signal Dout2[ ].

In this case, as the ABB filter 100 adopts the configurable circuit 120 in which the circuit configuration is changed by the switching circuit 110, while sharing the circuit elements, it is possible to reduce the circuit area of the ABB filter 100.

In this case, because the SAR ADC 200b is turned on in the first communication mode and the SAR ADC 200b is turned off in the second communication mode, it is also possible to reduce power.

FIG. 9 is a block diagram of an SoC 1000 according to an embodiment of the present disclosure.

Referring to FIG. 9, the SoC 1000 may include an application processor 1001 and a dynamic random access memory (DRAM) 1060.

The application processor 1001 may include a central processing unit (CPU) 1010, a modem 1020, a multi-level interconnection bus 1030, a memory system 1040, and a peripheral circuit 1050.

The CPU 1010 may perform operations needed to drive the SoC 1000. In an embodiment of the present disclosure, the CPU 1010 may be configured as a multi-core environment including a plurality of cores.

The modem 1020 may be used to perform a function of converting an analog signal into a digital signal. The modem 1020 may include an ADC, for example, the aforementioned first type ADC 200. That is, the modem 1020 may receive an analog signal from the RF receiver 50 and the ABB filter 100 for demodulating an RF signal to a baseband after receiving the RF signal, and may convert the analog signal into a digital signal. In addition, in an embodiment of the present disclosure, the modem 1020 may further include the RF receiver 50 and the ABB filter 100 therein.

The multi-level interconnection bus 1030 may be used for data communication among the CPU 1010, the modem 1020, the memory system 1040 and the peripheral circuit 1050. In an embodiment of the present disclosure, the multi-level interconnection bus 1030 may have a multilayer structure. For example, the multi-level interconnection bus 1030 may be, but is not limited to, a multilayer advanced high-performance bus (AHB) or a multilayer advanced extensible interface (AXI).

The memory system 1040 may provide an environment needed for the application processor 1001 to be connected to an external memory (e.g., the DRAM 1060) and operate at high speed. In an embodiment of the present disclosure, the memory system 1040 may include a separate controller (e.g., a DRAM controller) needed to control the external memory (e.g., the DRAM 1060).

The peripheral circuit 1050 may provide an environment needed for the SoC system 1000 to smoothly connect to an external device (e.g., a mainboard). Accordingly, the peripheral circuit 1050 may include various interfaces that enable the external device connected to the SoC system 1000 to be compatible with the SoC system 1000.

The DRAM 1060 may function as an operating memory needed for the operation of the application processor 1001. In an embodiment of the present disclosure, the DRAM 1060 may be placed outside the application processor 1001. For example, the DRAM 1060 may be packaged with the application processor 1001 in the form of package on package (PoP).

The semiconductor devices according to the above-described embodiments of the present disclosure may be provided as at least one of the elements of the SoC system 1000.

FIGS. 10 through 12 are diagrams illustrating semiconductor systems to which semiconductor devices according to embodiments of the present disclosure may be applied.

Referring to FIGS. 10-12, FIG. 10 illustrates a tablet personal computer (PC) 1200, FIG. 11 illustrates a notebook computer 1300, and FIG. 12 illustrates a smartphone 1400. At least one of the semiconductor device or the SoC described above may be used in the tablet PC 1200, the notebook computer 1300 and the smartphone 1400.

Further, it is obvious to those skilled in the art that semiconductor devices according to embodiments of the present disclosure may also be applied to other IC devices other than those set forth herein. That is, while the tablet PC 120, the notebook computer 1300, and the smartphone 1400 have been described above as examples of semiconductor systems according to the present disclosure, the examples of the semiconductor system according to the present disclosure are not limited to the tablet PC 1200, the notebook computer 1300, and the smartphone 1400. In an embodiment of the present disclosure, the semiconductor system may be provided as a computer, an ultra mobile PC (UMPC), a work station, a net-book computer, a personal digital assistant (PDA), a portable computer, a wireless phone, a mobile phone, an e-book, a portable multimedia player (PMP), a portable game console, a navigation device, a black box, a digital camera, a 3-dimensional television set, a digital audio recorder, a digital audio player, a digital picture recorder, a digital picture player, a digital video recorder, a digital video player, etc.

While the present disclosure has been described above with reference to embodiments illustrated in the accompanying drawings, it will be understood by those of ordinary skill in the art that various changes in form and detail may be made therein without departing from the scope of the present disclosure as defined by the appended claims and their equivalents.

What is claimed is:

1. A semiconductor device, comprising:
    a mode controller configured to output a first control signal in a first communication mode, and output a second control signal in a second communication mode which is different from the first communication mode; and
    a configurable circuit configured to generate a first output signal to be transmitted to a first type analog-to-digital converter (ADC) in the first communication mode, and generate a second output signal using a second type ADC in the second communication mode,
    wherein the configurable circuit comprises a switching circuit configured to change a circuit configuration to a first circuit configuration for generating a first output signal in the first communication mode or to a second circuit configuration for generating a second output signal in the second communication mode, depending on the first control signal or the second control signal received from the mode controller, and
    wherein the second type ADC utilizes an operational amplifier (OP AMP) of the configurable circuit that is used to generate the first output signal.

2. The semiconductor device of claim 1, wherein the first output signal comprises an analog signal, and the second output signal comprises a digital signal.

3. The semiconductor device of claim 1, wherein a first baseband corresponding to the first communication mode has a bandwidth higher than a second baseband corresponding to the second communication mode.

4. The semiconductor device of claim 1, wherein the first circuit configuration comprises a low pass filter (LPF) and a gain amplifier (GA).

5. The semiconductor device of claim 4, wherein the gain amplifier comprises a variable gain amplifier (VGA) or a programmable gain amplifier (PGA).

6. The semiconductor device of claim 1, wherein the second circuit configuration comprises the second type ADC.

7. The semiconductor device of claim 1,
    wherein the first type ADC comprises a Nyquist ADC, and the second type ADC comprises an oversampling ADC.

8. The semiconductor device of claim 7, wherein the first type ADC comprises a successive approximation register ADC (SAR ADC).

9. The semiconductor device of claim 7, wherein the second type ADC further comprises a delta-sigma modulation ADC (DSM ADC).

10. The semiconductor device of claim 9, wherein the delta-sigma modulation ADC is a discrete-time DSM ADC or a continuous-time DSM ADC.

11. The semiconductor device of claim 7, wherein the first type ADC is turned on in the first communication mode and turned off in the second communication mode.

12. The semiconductor device of claim 7, wherein the semiconductor device is further comprised to receive an analog signal, the semiconductor device is further configured to convert the analog signal into a digital signal using the configurable circuit having the first circuit configuration and the first type ADC in the first communication mode, and convert the analog signal into the digital signal using the configurable circuit having the second circuit configuration in the second communication mode.

13. The semiconductor device of claim 1, further comprising:

an radio frequency (RF) receiver configured to receive and demodulate radio frequency signals corresponding to the first communication mode or the second communication mode, and transmit the radio frequency signals to the configurable circuit.

14. The semiconductor device of claim 13, wherein the mode controller, the configurable circuit and the RF receiver are provided within a single integrated circuit.

15. The semiconductor device of claim 14, wherein the mode controller, the configurable circuit, the RF receiver and the first type ADC are provided within a single integrated circuit.

16. The semiconductor device of claim 1, wherein the mode controller, the configurable circuit and the first type ADC are provided within a single application processor (AP).

17. The semiconductor device of claim 1, further comprising:

a decimation filter configured to receive the second output signal to remove noise.

18. A semiconductor device, comprising:

a switching circuit comprising one or more switches which operate depending on a communication mode comprising a first communication mode and a second communication mode; and a digital signal generation circuit configured to receive an input of an analog signal, generate a digital signal using a first type analog-to-digital converter (ADC) if the one or more switches are in a first condition, and generate a digital signal using a second type ADC if the one or more switches are in a second condition which is different from the first condition, wherein a circuit configuration of the digital signal generation circuit comprises a first circuit configuration configured to generate the digital signal in the first communication mode, and a second circuit configuration configured to generate the digital signal in the second communication mode, and when conditions of the one or more switches are changed, the first circuit configuration and the second circuit configuration are changed to each other, and wherein the second type ADC utilizes an operational amplifier (OP AMP) of the digital signal generation circuit that is used to generate the analog signal.

19. The semiconductor device of claim 18, wherein the second circuit configuration comprises the second type ADC.

20. The semiconductor device of claim 18, wherein the first type ADC is turned on in the first communication mode and turned off in the second communication mode.

* * * * *